United States Patent
Meltzer et al.

[11] Patent Number: 5,500,479
[45] Date of Patent: Mar. 19, 1996

[54] POLYETHERSULFONE/POLYESTER BLOCK COPOLYMERS AND A PROCESS FOR THEIR PREPARATION

[75] Inventors: Aaron D. Meltzer, Pittsburgh, Pa.; Alexander Karbach, Krefeld, Germany

[73] Assignees: Bayer Corporation, Pittsburgh, Pa.; Bayer Aktiengesellschaft, Leverkusen, Germany

[21] Appl. No.: 311,621

[22] Filed: Sep. 23, 1994

[51] Int. Cl.⁶ .................................................. C08F 20/00
[52] U.S. Cl. ...................... 525/437; 525/534; 525/906; 528/173; 528/174
[58] Field of Search .................. 525/437, 471, 525/534; 528/173, 174

[56] References Cited

U.S. PATENT DOCUMENTS

| | | | |
|---|---|---|---|
| 4,517,354 | 5/1985 | D'Alelio | 528/172 |
| 4,906,500 | 3/1990 | McKenna | 428/67 |
| 5,036,150 | 7/1991 | Kawakami et al. | 528/173 |
| 5,151,462 | 9/1992 | El-Hibri et al. | 524/405 |
| 5,169,907 | 12/1992 | Kumpf et al. | 525/462 |
| 5,221,727 | 6/1993 | Kumpf et al. | 528/128 |
| 5,342,905 | 8/1994 | Kumpf et al. | 525/534 |

FOREIGN PATENT DOCUMENTS

| | | |
|---|---|---|
| 133907 | 3/1985 | European Pat. Off. |

*Primary Examiner*—George F. Lesmes
*Assistant Examiner*—Helen F. Lee
*Attorney, Agent, or Firm*—Joseph C. Gil; Aron Preis

[57] ABSTRACT

A block copolymer resin containing structural units conforming to

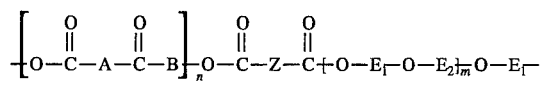

and a method for its preparation are disclosed. Accordingly, the block copolymer is prepared by reactive blending of an ester-containing polyether sulfone with a polyester. The block copolymer resin thus produced is characterized by its homogeneous morphology. The high level of its mechanical properties makes the resin suitable for a variety of applications.

5 Claims, 2 Drawing Sheets

POLYETHERSULFONE/POLYESTER BLOCK COPOLYMERS AND A PROCESS FOR THEIR PREPARATION

FIELD OF THE INVENTION

The invention relates to a process for preparing block copolymers and more particularly to reactive blending of ester-containing polyether sulfones with a polyester.

BACKGROUND OF THE INVENTION

Polyesters are well-known commercially available resinous materials which are high temperature, high performance thermoplastic engineering polymers with a combination of good thermal and good mechanical properties. These resins which are typically prepared by the condensation reaction of dihydroxy compounds and aromatic dicarboxylic acids are suitable in a variety of applications.

The art has long recognized the advantages of modifying the properties of resinous polymers by copolymerization techniques. In this regard, the preparation of block copolymers based on polyether/polyester carbonate has been disclosed in U.S. Pat. No. 5,169,907. In the process thus disclosed a polyether ketone (or other polyaryl ether)/polycarbonate block copolymer is prepared by transesterification of an ester containing polyaryl ether and a polycarbonate. Also relevant is U.S. Pat. No. 4,517,354 which disclosed certain polysulfone which may upon reacting with polyols or with polyamines yield the corresponding polyesters or polyamides. Blends of a poly(aryl ether), a polyalkylene terephthalate and a nucleating agent have been disclosed in U.S. Pat. No. 4,906,500. Blends of polyether sulfone with polyalkylene terephthalate have been disclosed in U.S. Pat. No. 5,151,462. Also relevant is European Patent Application 133,907, which disclosed a blend of polyarylether sulfone with a thermoplastic polyester. Polyarylates having improved hydrolytic stability were disclosed in U.S. Pat. No. 5,036,150. The arylates have repeating units derived from bis-(3,5-dimethyl-4-hydroxyphenyl)-sulfone optionally a dihydric phenol and a mixture of isophthalic acid and terephthalic acid or their derivatives.

It is an object of the present invention to provide block copolymers of polyethersulfone/polyester which have a predictable block length.

It is another object of the present invention to provide polyethersulfone sulfone/polyester block copolymers which may be formed in an extruder.

It is also an object of the present invention to provide a process for producing polyethersulfone sulfone/polyester block copolymer via reactive melt blending.

Another object of the present invention to provide a process for producing polyethersulfone sulfone/polyester block copolymers which may be carried out in a relatively short period of time.

These and other objects which will be apparent to those skilled in the art are accomplished by copolymerizing an ester group containing polyethersulfone (herein ePSU) with a thermoplastic polyester. This copolymerization is carried out, with or without a catalyst, by reactive melt blending of the components.

SUMMARY OF THE INVENTION

A block copolymer resin conforming structurally to

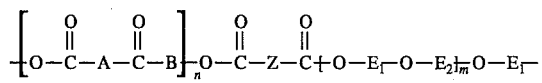

and a method for its preparation are disclosed. Accordingly, the block copolymer is prepared by reactive blending of ePSU with a polyester. The block copolymer resin thus produced is characterized by its level of homogeneity on a microscopic scale. The high level of its mechanical properties makes the resin suitable for a variety of applications.

DETAILED DESCRIPTION OF THE INVENTION

Figure 1:
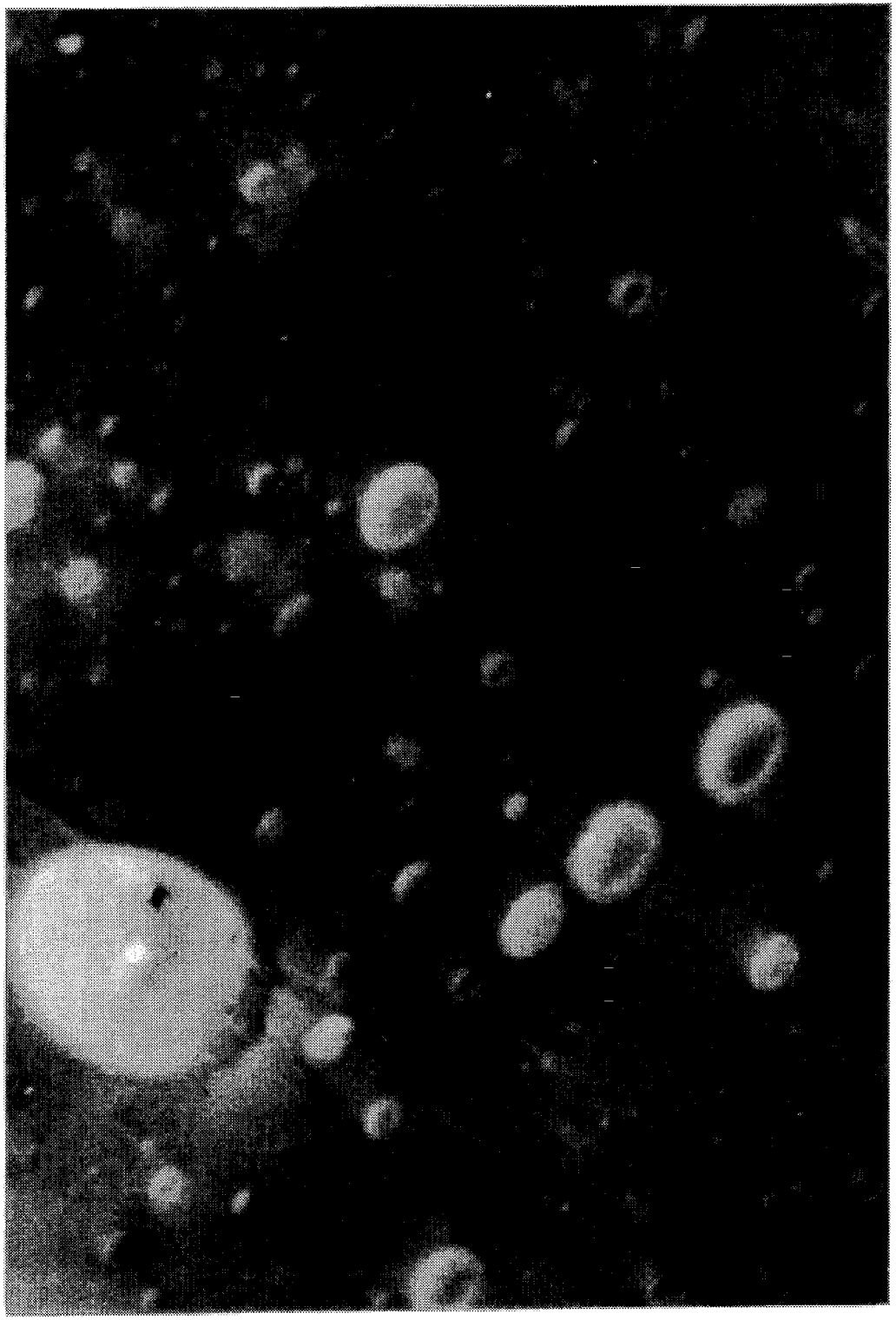
FIG. 1 is an electron micrograph (magnification of 7500:1) of the structure of a blend of PET and polyether sulfone (PSU).

The present invention relates to block copolymers containing structural units conforming to

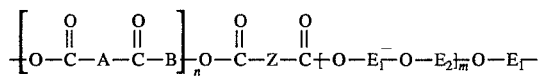

in which

A and Z independently one of the other denote the residue of a $C_6$–$C_{24}$ aromatic dicarboxylic acid, B is the residue of an aliphatic or cycloaliphatic $C_2$–$C_8$ diol, $E_2$ denotes the residue of a dihalodiaryl sulfone and $E_1$ denotes the residue of a aromatic dihydroxy compound, and n is an integer of 1 to 100 preferably about 5 to 20, and m is an integer of 1 to 100, preferably 5 to 20.

The term "residue" as used in the context of this invention refers to that portion of the compound without its reactive functional groups.

The block copolymer of the invention is prepared by reactive blending in the melt. The reactants comprise (i) ePSU containing structural units conforming to

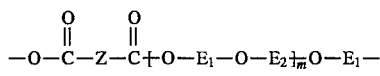

and (ii) a thermoplastic polyester containing structural units conforming to

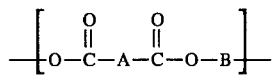

where the terms have the meaning noted above.

The relative molar amounts of these reactants are 10 to 90% of ePSU and 10 to 90% of thermoplastic polyester. The preferred ranges are 30 to 70% of ePSU and 30 to 70% of thermoplastic polyester. The reaction in accordance with the present invention is carried out by melt blending at temperatures above about 250° C., typically in the presence of a Lewis acid as catalyst, for a period not less than 0.5 minutes, more typically 2 to 30 minutes, to produce the inventive block copolymer.

A process for the preparation of an ester group-containing polyether sulfone has been disclosed in patent application 08/010,736 which was filed Jan. 29, 1993 (Attorney Docket Number Mo3903) and which shares a common assignee with the instant application. Essentially, ePSU may be prepared by reacting a dihalogenodiphenyl sulfone with excess amount of an aromatic dihydroxy compound to form a reaction product, and then reacting a carboxylic acid or its derivative with the reaction product to produce an ester group-containing polyether sulfone. The carboxylic acid derivative in the present context is any of dicarboxylic acid halide or the anhydride of such acids, for instance an acid chloride or its anhydride. The amount of dicarboxylic acid halide used is that which is sufficient to react with the excess amount of the aromatic dihydroxy compound and with said reaction product.

The dihalogenodiphenyl sulfone suitable in the process of the invention conforms to $$X\text{—}Ar\text{—}SO_2\text{—}Ar\text{—}X$$

wherein X denotes a halogen preferably F, Cl or Br, and Ar denotes $C_6$–$C_{24}$ aryl, alkylaryl or cycloalkylaryl. The preferred dihalogenodiphenyl sulfone is 4,4'-dichlorodiphenyl sulfone.

The aromatic dihydroxy compound conforms to formulae (1) or (2).

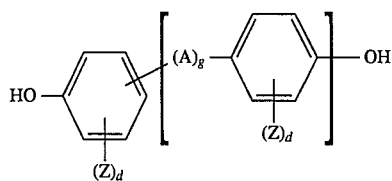
(1)

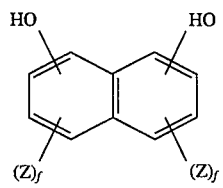
(2)

wherein

A denotes an alkylene group with 1 to 8 carbon atoms, an alkylidene group with 2 to 8 carbon atoms, a cycloalkylene or a cycloalkane group with 5 to 15 carbon atoms, a cycloalkylidene group with 5 to 15 carbon atoms, a carbonyl group, an oxygen atom, a sulfur atom, —SO— or —$SO_2$ or a radical conforming to

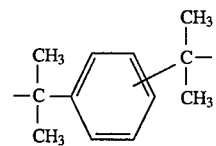

g denotes the number 0 to 1;

Z denotes F, Cl, Br or $C_1$–$C_4$-alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cydohexane, 4,4'-(3,3,5-trimethyl-cyclohexylidene) diphenol, α,α'-bis-(4 -hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4 -hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxybenzophenone, 2,4-bis-(3,5-dimethyl-4-hydroxyphenyl)-cyclohexane, α-α'-bis(3,5-dimethyl-4-hydroxyphenyl)-p-diisopropyl-benzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The carboxylic acid derivative is preferably an aromatic carboxylic acid halide, preferably conforming to $$\text{Hal-C(O)—Ar—C(O)-Hal}$$

where Ar is an aromatic radical, most preferably terephthaloyl chloride or isophthaloyl chloride.

In preparing ePSU, the relative molar amounts of the reactants may range as follows: aromatic dihydroxy compound: dihalogenodiphenyl sulfone: carboxylic acid derivative=3:2:1 to 21:19:2.

The first step of the process for preparing ePSU is carried out in a solvent or a mixture of solvents and in the presence of a base. The solvent is an aprotic polar solvent or its mixture with a second solvent which will form an azeotrope with water. The preparation of ePSU is generally carried out in the presence of a basic catalyst. The base, used at an equivalent ratio ≧1 is an alkali, or alkaline earth, metal hydroxide or the corresponding carbonate. Examples include potassium carbonate, potassium hydroxide, sodium carbonate, sodium bicarbonate and calcium hydroxide.

Suitable solvents include N-methylpyrrolidone, N-methylcaprolactam, dimethylsulfoxide, diphenylsulfone and sulfolan. These solvents are generally employed in an amount of from about 0.5 to about 50 parts by weight, preferably from about 2 to about 20 parts by weight based on the total weight of the reactants.

The ePSU is generally prepared by reacting the dihalide and bisphenols at temperatures of from about 130° to about 320° C. for from about 1 to about 50 hours. Suitable techniques for carrying out the reaction for preparing ePSU are known.

The ePSU suitable for the preparation of the block copolymer of the present invention has a number average molecular weights (as determined by gel permeation chromatography using polystyrene as the standard) of from about 560 to about 300,000, preferably from about 1000 to about 200,000 and most preferably from about 2000 to about 100,000.

In the process in accordance with the present invention, ePSU is reacted with a thermoplastic polyester under conditions of reactive melt blending. The thermoplastic polyesters useful in the context of the invention are preferably poly(alkylene terephthalates) selected from the group consisting of poly(ethylene terephthalate), poly(butylene terephthalate) and poly(alkylene naphthalates). The polyesters have an intrinsic viscosity of about 0.4 to 2.0 dl/g as measured in a 60:40 phenol/tetrachloroethane mixture or similar solvent at about 23° to 30° C.

Specific examples of appropriate polyesters include those containing structural units conforming to

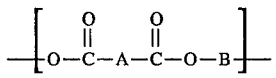

in which

B represents the residue of a $C_2$–$C_8$ aliphatic or cycloaliphatic diol, preferably $C_2$–$C_4$ aliphatic diol and A denotes the residue of a $C_6$–$C_{24}$, preferably $C_6$–$C_{10}$ aromatic dicarboxylic acid.

The suitable thermoplastic polyesters also include copolyesters based on two or more of the suitable acids or diols. The suitable polyesters are known and are readily available in commerce. Alternatively, suitable polyesters may be made by following the teachings of for example U.S. Pat. Nos. 2,465,319, 2,901,466 and 3,047,539 which are incorporated herein by reference.

A catalyst is not necessary in the process of the present invention, however, it would be possible to include a catalyst. Where used, the catalyst is generally employed in an amount of from about 0.1 to about 1.0 wt.%. Specific examples of suitable catalysts include: potassium acetate, sodium acetate, antimony trioxide.

The process of the present invention may carried out at temperatures of from about 250° C. to about 400° C., preferably, from about 300° C. to about 350° C. in conventional kneaders or extruders provided the time and temperature conditions which are required in accordance with the invention are adhered to.

Morphologically, the block copolymers of the present invention are homogeneous. They feature good mechanical properties at high temperatures.

Having thus described our invention in detail, the following examples are given as being illustrative thereof. All parts and percentages given in these examples are parts by weight and percentages by weight, unless otherwise indicated.

EXAMPLES

Example 1

Synthesis of Ester-containing Poly (ethersulfone)

Difluorodiphenylsulfone (25.43 g; 0.1 mol), bisphenol A (18.7 g; 0.082 mol), 4'-hydroxy phenyl-4-hydroxybenzoate (4.14 g; 0.018 mol), and $K_2CO_3$ (15.2 g; 0.11 mol) were combined with 100 ml of NMP and 65 ml toluene in a 250 ml 3-neck flask (all glassware was previously flame dried). A mechanical stirrer, Dean-Stark trap (12 ml volume) with condenser and $N_2$ outlet and a Claisen adapter with $N_2$ inlet and thermocouple were attached and the entire system was purged with $N_2$ for 10 minutes. The solution was heated at 155° C. for 8 hours. During this time, toluene and water collected in the Dean-Stark trap. After 8 hours, 20 ml of toluene and water were allowed to drain from the trap and the temperature was raised to 180° C. After 5 hours, the toluene was drained and the temperature increased to 187° C. for 2 hours. During this time, the yellow/green solution became very viscous. The solution was cooled to room temperature, diluted with 100 ml NMP and then poured into a large excess of methanol to precipitate a fibrous white polymer. The fibrous white polymer was collected and redissolved in methylene chloride. The methylene chloride solution was washed with 10% HCl and water and then poured into methanol to precipitate the polymer. The polymer was dried in vacuum at 80° C. for 8 hours. A yield of 97%–99% was achieved.

The resulting polymer was characterized as follows: Molecular weight as measured by GPC (polystyrene standard) $M_w$=55600; $M_n$=25600; $M_w/M_n$=2.2. Thermal properties as measured by DSC: $T_g$=154° C.

Example 2

Synthesis of Ester-containing Poly (ethersulfone)

Difluorodiphenylsulfone (25.43 g; 0.1 mol), bisphenol A (20.75 g; 0.0909 mol), 4'-hydroxy phenyl-4-hydroxybenzoate (2.093 g; 0.0091 mol.), and $K_2CO_3$ (15.2 g; 0.11 mol) were combined with 100 ml of NMP and 65 ml toluene in a 250 ml 3-neck flask (all glassware was previously flame dried). A mechanical stirrer, Dean-Stark trap (12 mL volume) with condenser and $N_2$ outlet and a Claisen adapter with $N_2$ inlet and thermocouple were attached and the entire system was purged with $N_2$ for 10 minutes. The solution was heated at 155° C. for 8 hours. During this time, toluene and water collected in the Dean-Stark trap. After 8 hours, 20 ml of toluene and water were allowed to drain from the trap and the temperature was raised to 180° C. After 5 hours, the toluene was drained and the temperature increased to 187° C. for 2 hours. During this time, the yellow/green solution became very viscous. The solution was cooled to room temperature, diluted with 100 ml NMP and then poured into a large excess of methanol to precipitate a fibrous white polymer. This fibrous white polymer was collected and redissolved in methylene chloride. The methylene chloride solution was washed with 10% HCl and water and then poured into methanol to precipitate the polymer. The polymer was then dried in a vacuum at 80° C. for 8 hours. A yield of 97%–99% polymer with an inherent viscosity (NMP, 30° C.) of 0.45 dl/g was obtained. Thermal properties as measured by DSC: $T_g$=165° C.

Example 3

A 500 ml 3-neck flask was loaded with dichlorophenyl sulfone (29.4 g; 0.102 mol), bisphenol-A (28.5 g; 0.125 mol), $K_2CO_3$ (19.7 g; 0.14 mol), 200 ml of N-methyl pyrrolidone and 60 ml of toluene. The reaction flask was fitted with a Dean-Stark trap and mechanical stirrer and was heated to 155° C. The reaction mixture was left stirring at 155° C. for about 6 hours, collecting $H_2O$ in the trap. The reaction mixture was subsequently heated to 180° C. for 6 hours while distilling off the necessary amount of toluene. After allowing the reaction mixture to cool, terephthaloyl chloride (4.7 g, 0.02 mol) and triethylamine (10 ml) were added. The reaction mixture was subsequently precipitated into methanol, re-dissolved in methylene chloride, washed three times with 50 ml of 1N HCl, and three times with distilled water and precipitated into methanol. The structure was conforms to

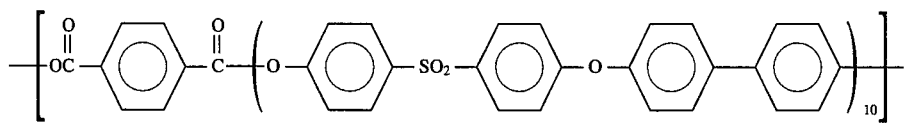

was verified by IR, specifically to the carbonyl band at 1725 cm$^{-1}$. The molecular weight ($M_n$) of the product was 26,000. The ePSU of this example contains about 20 mol % ester groups.

Example 4

Preparation of Block Copolymer in a Haake Mixer: The ester-containing polyethersulfone prepared in accordance with Example 3 and thermoplastic polyester (PET) which is sold under the trademark Ektar by Eastman Kodak at a weight ratio between them of about 53/47 were placed in a Haake mixer equipped with kneading elements. The polymers were melt blended at 340° C. for 40 min. The product thus prepared was then used for the preparation of test specimens by hot-pressing at 340° C. for 2 minutes under a pressure of 2 MPa. Films of the as-kneaded sample of block copolymers were viewed by transmission electron microscopy (RuO$_4$ stained). A comparison was conducted by blending corresponding amounts of PET with PSU which contained no ester groups.

Figure 2:
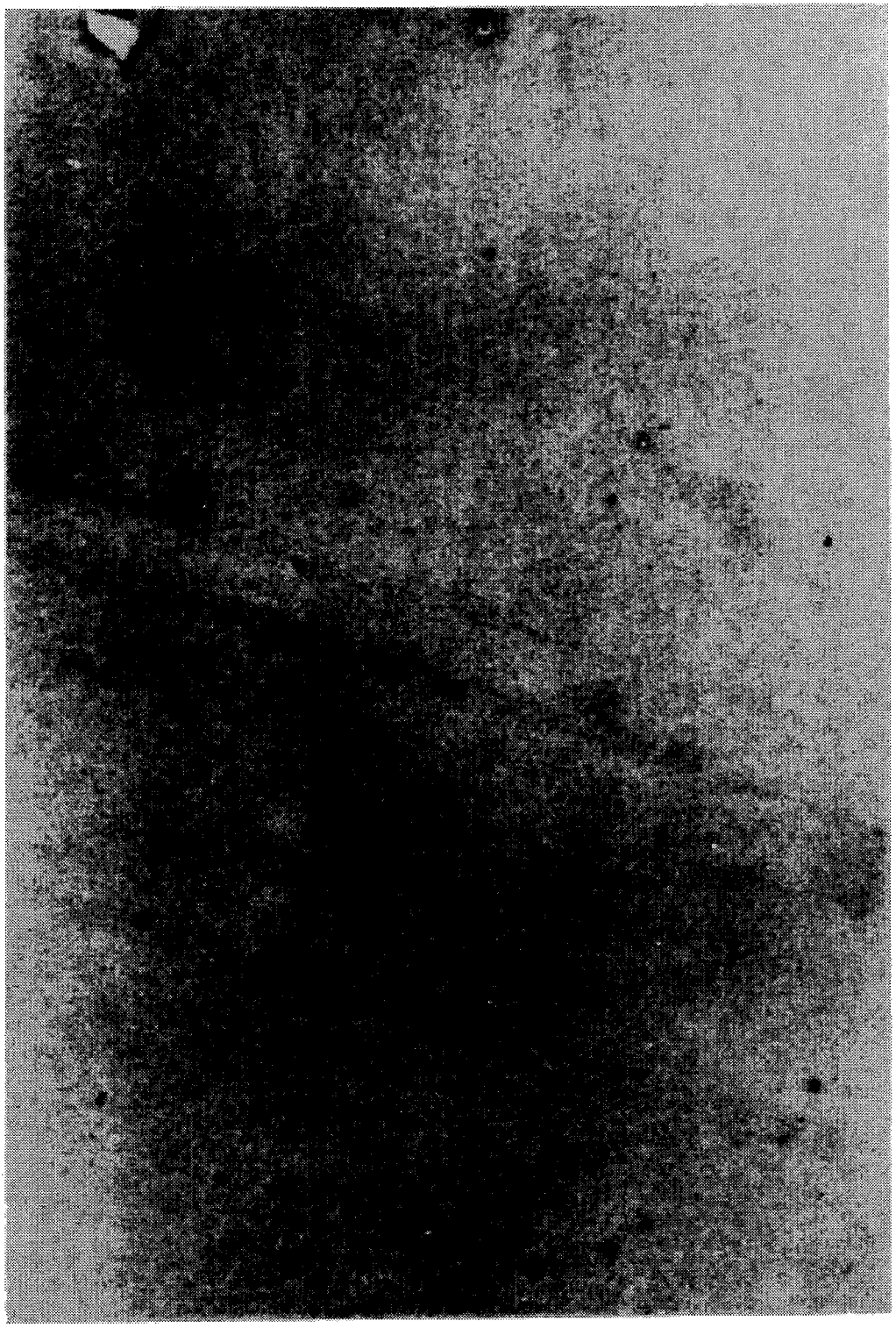
FIG. 2 is an electron micrograph (magnification of 7500:1) of the structure of the copolymer of the invention.

FIG. 1 is an electron micrograph (magnification of 7500:1) of the structure of a blend of PET and PSU. FIG. 2 is an electron micrograph (magnification of 7500:1) of the structure of a reactive blend of PET and ePSU. These micrographs demonstrate the advantage represented by the reactive blending of the present invention over the mere blending of closely corresponding components. The former is much more homogeneous than the later.

Example 5

The table below summarizes the results of the evaluation of a blend of PET/PSU set in comparison to the block copolymer of the invention. The block copolymer exhibits a single glass transition temperature. The block copolymer also has a lower degree of crystallinity as evidenced by its lower melt temperature ($T_m$) and enthalpy of melting ($\Delta H$).

|  | Blend | Block Copolymer |
| --- | --- | --- |
| Tg | 68 and 168° C. | 168° C. |
| Tm | 240° C. | 195° C. |
| ΔH | 23.5 J/g | 6.7 J/g |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a block copolymer comprising reactively blending in the melt at a temperature above 250° C. and for a time of at least 0.5 minutes, (i) an ester-containing polyethersulfone containing structural units conforming to

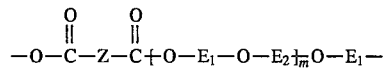

wherein m is about 1 to 100, and a thermoplastic polyester containing structural units conforming to

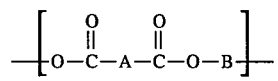

where

A and Z independently one of the other denote the residue of a $C_6$–$C_{24}$ aromatic dicarboxylic acid, B is the residue of an aliphatic or cycloaliphatic $C_2$–$C_8$ diol, $E_2$ denotes the residue of a dihaloaryl sulfone, and $E_1$ denotes the residue of a aromatic dihydroxy compound, at molar amounts of 90 to 10 percent of said (i) and 10 to 90 percent of said (ii).

2. The process of claim 1 wherein said (i) has a number average molecular weight of about 560 to 300,000.

3. The process of claim 2 wherein said B denotes a $C_{2-4}$ aliphatic diol.

4. The process of claim 3 wherein said relative molar amounts are 30–70% of (i) and 70–30% of (ii).

5. The process of claim 4 wherein time is about 2 to 30 minutes.